US012091628B2

(12) United States Patent
Crozet et al.

(10) Patent No.: US 12,091,628 B2
(45) **Date of Patent: *Sep. 17, 2024**

(54) ESTOLIDE COMPOSITION AND PROCESS FOR MAKING ESTOLIDES

(71) Applicant: TOTALENERGIES ONETECH, Courbevoie (FR)

(72) Inventors: Delphine Crozet, Villeurbanne (FR); Alice Limoges, Ternay (FR); Laurent Germanaud, Saint Alyre d'Arlanc (FR); Henri Strub, Pont Sainte Maxence (FR); Grégoire Hervé, Paris (FR); Djibril Faye, Eragny (FR); Yves Travert, Eragny (FR)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/785,605

(22) PCT Filed: Dec. 18, 2020

(86) PCT No.: PCT/FR2020/052523

§ 371 (c)(1),
(2) Date: Jun. 15, 2022

(87) PCT Pub. No.: WO2021/123658

PCT Pub. Date: Jun. 24, 2021

(65) Prior Publication Data

US 2023/0090084 A1 Mar. 23, 2023

(30) Foreign Application Priority Data

Dec. 20, 2019 (FR) ...................................... 1915152

(51) Int. Cl.

| | |
|---|---|
| ***C10M 105/34*** | (2006.01) |
| ***C11C 3/08*** | (2006.01) |
| *C10N 20/00* | (2006.01) |
| *C10N 30/00* | (2006.01) |

(52) U.S. Cl.

CPC ............. *C10M 105/34* (2013.01); *C11C 3/08* (2013.01); *C10M 2207/301* (2013.01); *C10N 2020/081* (2020.05); *C10N 2030/64* (2020.05)

(58) Field of Classification Search

CPC ..... C11C 3/08; C10M 105/40; C10M 105/34; C10M 2207/286; C10M 2207/301; C10M 2207/281; C10M 2207/2885; C10M 2207/2865; C10N 2030/06; C10N 2020/081; C10N 2030/64; C10N 2070/00

See application file for complete search history.

(56) References Cited

U.S. PATENT DOCUMENTS

| | | | |
|---|---|---|---|
| 5,458,795 | A | 10/1995 | Lawate |
| 2013/0324754 | A1 | 12/2013 | Bredsguard |

*Primary Examiner* — Vishal V Vasisth

(74) *Attorney, Agent, or Firm* — DUANE MORRIS LLP; Gregory M. Lefkowitz; Brandon A. Chan

(57) ABSTRACT

The invention relates to a composition preparation method for preparing a composition of estolides, the method comprising reacting an unsaturated compound of a type such as an acid or ester, with a saturated fatty acid; in the presence of a catalyst of a type such as sulphonic acid, the said method including no vacuum distillation step thereby making it possible to separate the monoestolides from the polyestolides. The invention also relates to a composition of estolides that is obtainable by the method according to the invention and the use thereof in lubricating compositions.

18 Claims, No Drawings

ESTOLIDE COMPOSITION AND PROCESS FOR MAKING ESTOLIDES

CROSS-REFERENCE TO RELATED APPLICATIONS

This application is a § 371 national stage entry of International Application No. PCT/FR2020/052523, filed on Dec. 18, 2020, which claims priority to French Patent Application No. 1915152, filed on Dec. 20, 2019, the entire contents of which are incorporated herein by reference.

TECHNICAL FIELD OF THE INVENTION

The invention relates to a method for preparing a composition of estolides having improved selectivity towards monoestolides and a good degree of conversion.

The invention also relates to a composition of estolides (estolide composition) that is obtainable by the method of the invention and the use thereof as base oil in a lubricating composition.

STATE OF THE ART

Lubricating compositions, also known as lubricants, are widely used in order to reduce friction between the surfaces of moving parts and thus reduce wear and prevent degradation or damage to the surface of these parts. The lubricants typically include a base oil and one or more functional additives.

When the lubricating composition is subjected to high stresses (ie high pressures) during its use, the lubricating compositions wherein the base oil consists of hydrocarbons tend to break down causing the parts to then get damaged.

Manufacturers of lubricants must constantly improve their formulations in order to respond to increased demands with respect to fuel economy while also maintaining engine cleanliness and reducing emissions. Given these requirements manufacturers are obliged to reassess their formulation capabilities and/or to undertake research to seek out new base oils that are capable of satisfying stringent performance requirements.

In order to manufacture lubricants, such as engine oils, transmission fluids, gear oils, industrial lubricating oils, metalworking oils, etc, one typically starts with a petroleum-based oil of lubricating grade derived from a refinery, or from a suitable polymerised petrochemical fluid. In this base oil, small amounts of additives are blended therein so as to enhance the properties and performance thereof, such as augmenting of lubricity, anti-wear and anti-corrosion properties, and the resistance of the lubricant to heat and/or oxidation. Thus, various additives such as antioxidants, corrosion inhibitors, dispersing agents, antifoaming agents, metal deactivators and other additives that can be used in lubricant formulations may be added in conventional effective amounts.

Environmental restrictions and concerns continue to lead manufacturers to seek alternatives to sources that are petroleum based (fossil). Oils of plant or animal origin have therefore proven to be interesting sources of base oils. In particular, these oils of plant or animal origin may be converted into an acid or an ester by conventional methods.

In the American Petroleum Institute (API) Classification of Base Oils, esters are referred to as Group V base oils. Synthetic esters may be used both as a base oil and as an additive in lubricants. In comparison to cheaper but less environmentally safe mineral oils, synthetic esters were mainly used as base oils in cases where there were strict requirements in respect of the viscosity/temperature behaviour that had to be met. The increasingly important issues of environmental acceptability and biodegradability are driving the desire to find alternatives to mineral oil as a raw material in lubrication applications.

Estolides are biodegradable, bio-based base oils that may be used in lubricants.

The document US 2015/0094246 describes estolide compositions intended for use in lubricating compositions. This document describes a preparation method in which fatty acids of such type as oleic acid are reacted in the presence of a catalyst, this reaction step being followed by a centrifugal distillation step of a type such as Myers 15, at 200 or at 300° C. under an absolute pressure of 12 microns (0.012 torr) in order to remove the monoesters.

S C Cermak et al, J. Am. Oil Chem. Soc. (2013) 90:1895-1902, described the preparation of estolides from a composition of unsaturates comprising 90% of oleic acids and butyric or acetic fatty acid. This document discloses a vacuum distillation separation step for separating the monoestolides from the polyestolides by vacuum distillation.

Perchloric acid is currently the catalyst most often used for the formation of estolides. However, this catalyst mainly results in polyestolides and polyestolides having an estolide index (EN or "estolide number", per the accepted terminology) often greater than 2 or even greater than 3, by defining an estolide number equal to zero for the monoestolides and greater than 0 for polyestolides.

Several reactions compete when it is appropriate to react unsaturated fatty acids or esters of unsaturated fatty acids in the presence of a catalyst. Thus, the desired reaction targeted in order to form the estolides of the invention is an addition reaction causing adding of the acid functional group on a carbon-carbon double bond. However, transesterification reactions may possibly occur. The reaction between the unsaturated acid or ester thereof with the saturated fatty acid can also lead to polyestolides. In the context of the present invention, the targeted product is a monoestolide because it typically has a lower viscosity, which is particularly advantageous for lubricating applications.

Typically, currently existing estolide compositions have a kinematic viscosity at 40° C. of the order of 10 cSt to 100 cSt.

The methods described in the prior art do not serve the purpose of obtaining satisfactory selectivity towards monoestolide, whether in acid form or in ester form, while also maintaining a good conversion rate, and without needing a physical separation step, in particular without needing a separation step, such as molecular distillation, for separating compounds via their physico-chemical properties. Thus, the methods of the prior art conventionally require subsequent steps of hydrogenation given the insufficient conversion rate, and subsequent steps of distillation of the composition resulting from the addition reaction (estolide formation reaction) in order to separate the product of interest, in particular the monoestolide. However, as it so proved, this distillation step was not always simple, in particular because of the sometimes high boiling temperatures of the compounds to be separated. Such high temperatures can lead to degradation of the compounds.

In a surprising manner the applicant found that it was possible to obtain a composition of estolides with a high selectivity towards monoestolides, with this being accompanied by a satisfactory conversion rate, which makes it possible to dispense with a subsequent distillation step intended to separate the various products, the latter moreover without needing to hydrogenate the estolides obtained by the method.

SUMMARY OF THE INVENTION

The invention relates to a method for preparing a composition of estolides that comprises reacting at least one unsaturated compound selected from among unsaturated fatty acids containing from 10 to 20 carbon atoms and esters of unsaturated fatty acids containing from 10 to 20 carbon atoms, and the mixtures thereof; with at least one saturated fatty acid containing from 4 to 18 carbon atoms; in the presence of at least one catalyst comprising at least one sulphonic acid functional group;

the said method including no vacuum distillation step thereby making it possible to separate the monoestolides from the polyestolides.

Typically, the method according to the invention does not include a hydrogenation step. In other words, preferably, the composition of estolides obtained in the invention does not undergo a hydrogenation step.

Preferably, the preparation method of the invention does not include a step during which 1 equivalent of 2-ethylhexyl oleate is caused to react with 6 equivalents of lauric acid in the presence of 0.25 equivalent of triflic acid.

According to one embodiment, the unsaturated compound is selected from among unsaturated fatty acids containing from 11 to 20 carbon atoms. Preferably, the method also comprises an esterification step for esterifying the composition of estolides obtained, preferably by reaction of the estolides with an alcohol containing from 1 to 16 carbon atoms.

According to one embodiment, the catalyst is selected from:

- a catalyst having the formula $RSO_3H$, optionally supported, where R is a hydrogen atom or a linear, branched or cyclic hydrocarbon radical having from 1 to 18 carbon atoms, optionally substituted by one or more heteroatoms, for example of nitrogen, fluorine, oxygen, sulfur, silicon type; and
- a catalyst in the form of a polymer having the formula (1):

[Chem 1]

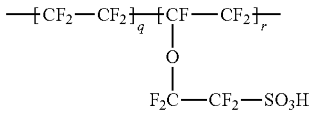

in which q and r represent independently of each other a non-zero number ranging from 1 to 15.

According to one embodiment, the reaction is carried out at a temperature ranging from 20 to 90° C., preferably from 30 to 80° C., more preferably from 40 to 70° C.

According to one embodiment, the molar ratio of the unsaturated compound/saturated fatty acid ranges from 1/10 to 1/1, preferably from 1/8 to 1/4.

According to one embodiment, the molar ratio of the unsaturated compound/catalyst ranges from 1/0.1 to 1/1, preferably from 1/0.15 to 1/0.5.

The invention also relates to a composition of estolides that is obtainable by the method according to the invention, the composition comprising, relative to the total weight of the estolides:

- from 65 to 99.9% by weight of monoestolide(s) in the form of acid and/or ester; and
- from 0.1 to 35% by weight of polyestolide(s) in the form of acid and/or ester.

Preferably, the estolide composition of the invention does not comprise estolides obtained by reacting 1 equivalent of 2-ethylhexyl oleate with 6 equivalents of lauric acid in the presence of 0.25 equivalent of triflic acid.

According to one embodiment, the estolide composition according to the invention may not be obtained by reacting 2-ethylhexyl oleate with lauric acid.

According to one embodiment, the saturated fatty acid is other than lauric acid and the unsaturated compound is other than 2-ethylhexyl oleate.

The invention also relates to the use of the estolide composition according to the invention, as base oil in a lubricating composition, the said estolides of the estolide composition being in ester form.

Finally, the invention relates to a lubricating composition comprising the estolide composition according to the invention and at least one base oil other than the estolides and/or at least one additive.

The method of the invention makes it possible to obtain a very high selectivity towards the formation of a monoestolide, thanks to the use of a specific catalyst: a catalyst comprising at least one sulphonic acid functional group. In addition to the very good selectivity towards monoestolides, the method according to the invention will provide the means to obtain polyestolides with a low number of addition reactions. In other words, at least 50% by weight, or even at least 70% by weight, or indeed even at least 90% by weight of the polyestolides which will be obtained in the method of the invention will be polyestolides where the EN ("estolide number" per the accepted terminology, or estolide index) is equal to 2, it being understood that, within the meaning of the present invention, EN is equal to 1 for the monoestolides and EN is strictly greater than 1 for the polyestolides.

The method according to the invention makes it possible to dispense with a separation step of separating the monoestolides from the polyestolides, a step that can sometimes be difficult to implement.

DETAILED DESCRIPTION OF THE INVENTION

The invention relates to a method for producing an estolide composition, the said method comprising reacting at least one unsaturated compound selected from among unsaturated fatty acids containing from 10 to 20 carbon atoms, or esters thereof (referred to as "unsaturated fatty acid esters" or "unsaturated esters"), with at least one saturated fatty acid containing from 4 to 18 carbon atoms; in the presence of at least one catalyst comprising at least one sulphonic acid functional group;

- the said method not including a subsequent vacuum distillation step for separating the monoestolide(s) from the polyestolide(s),
- preferably, the said method does not include a hydrogenation step of hydrogenating the composition of estolides.

The method for producing an estolide composition according to the invention comprises in particular the reaction between an olefin functional group (carbon-carbon double bond) of an unsaturated compound of unsaturated acid type or of unsaturated acid ester type and a carboxylic acid functional group of a saturated fatty acid.

Within the meaning of the present invention, an "estolide" refers to the product resulting from the addition reaction of a carbon-carbon double bond of an unsaturated compound of a an acid type or of an ester type with a carboxylic acid functional group. The term "estolide" in the present invention will refer to both a "monoestolide" and a "polyestolide".

Within the meaning of the present invention, a "monoestolide" refers to an estolide resulting from a single addition reaction between an olefin functional group of an unsaturated acid or ester with an acid functional group of a saturated fatty acid. The monoestolide may be in acid form or in ester form depending on whether the unsaturated compound is in the acid or ester form. The monoestolide in acid form may then be esterified in order to obtain an ester monoestolide that falls within the scope of the present invention.

Within the meaning of the present invention, a "polyestolide" refers to the product resulting from the reaction between at least two unsaturated compounds (in acid or ester form) optionally followed by the reaction with a saturated acid. The polyestolide may be in acid form or in ester form depending on whether the unsaturated compound is in the acid or ester form. The polyestolide in acid form may then be esterified in order to obtain an ester polyestolide that falls within the scope of the present invention.

The method of the invention does not include a vacuum distillation step making it possible to separate the monoestolides produced from the polyestolides produced. In particular, the method of the invention does not include vacuum distillation of a type such as Myers distillation making it possible to separate the monoestolides from the polyestolides.

Indeed, the method of the invention exhibits a high selectivity in favour of monoestolides, in a manner so as to make it possible to dispense with such a distillation step.

It should be noted that the method of the invention may include one or more operations that provide the ability to separate the saturated acid and/or the unsaturated compound, starting reactant of the method of the invention, or unsaturated ester possibly produced in situ during an esterification step for in situ esterification of the estolides. These operations may be stripping steps or distillation operations, it being understood that these distillation operations differ from the distillation steps for separating the monoestolides from the polyestolides.

The method according to the invention may also include one or more washing operations to separate the homogeneous catalyst from the product resulting from the method of the invention or one or more filtration steps to separate the heterogeneous catalyst from the product resulting from the method of the invention.

By way of a preliminary observation, it will be noted that, in the description and the claims that follow, the expression "included/comprised between" is to be understood as including the limits cited.

Unsaturated Ester or Unsaturated Fatty Acid

The method of the invention makes use of at least one unsaturated fatty acid and/or one of the esters thereof (referred to as "unsaturated compound") as reactant for the reaction with the saturated fatty acid.

The unsaturated fatty acid may be a linear or branched fatty acid comprising one or more unsaturations, preferably one single unsaturation.

Preferably, the unsaturated fatty acid is a linear fatty acid comprising a single unsaturation.

Preferably, the unsaturated fatty acid is a monoacid which comprises no other functional group other than the acid functional group and the carbon-carbon double bond.

Preferably, the fatty acid or ester thereof is a monounsaturated monofatty acid or a monounsaturated monoester.

Preferably, the unsaturated fatty acid contains from 11 to 18 carbon atoms.

According to one embodiment, the unsaturated fatty acid corresponds to the formula (2):

[Chem 2]

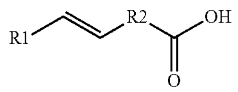

or to the formula (3):

[Chem 3]

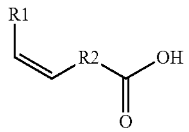

wherein:

R1 represents a hydrogen atom or a monovalent alkyl radical, either linear or branched, containing from 1 to 16 carbon atoms, preferably from 4 to 14 carbon atoms; advantageously R1 represents a hydrogen atom or a linear alkyl containing from 5 to 12 carbon atoms;

R2 represents a divalent alkylene radical, either linear or branched, containing from 1 to 16 carbon atoms; preferably a linear or branched alkylene containing from 3 to 13 carbon atoms, advantageously a linear alkylene containing from 4 to 9 carbon atoms;

it being understood that the sum of the number of carbon atoms of R1 and R2 ranges from 7 to 17, preferably from 8 to 17.

It should be noted that the two cis/trans isomers, illustrated for example by the formulas (2) and (3) may be in equilibrium in the reaction medium. It should also be noted that positional isomers may be present in the reaction medium.

The unsaturated acid used in implementing the method of the invention may be a mixture of at least two different unsaturated acids. Within the meaning of the present invention, two compounds are the said to be "different" if they do not have the same empirical formula. By way of example, two cis/trans isomers or two positional isomers are not different compounds within the meaning of the present invention. Two positional isomers differ in the position of the carbon-carbon double bond on the hydrocarbon chain.

If the method makes use of a mixture of at least two different unsaturated acids, the said mixture preferably comprises at least 70% by weight, more preferably at least 80% by weight, advantageously at least 85% by weight, of a same given acid and/or of the isomer thereof, relative to the total weight of the mixture of at least two different unsaturated acids.

According to one embodiment, the unsaturated fatty acid is oleic acid and/or its trans isomer. Depending on whether the unsaturated compound is derived from natural or synthetic sources, the said unsaturated compound may be in its cis form and/or in its trans form when it is used in implementing the method of the invention.

According to another embodiment, the reaction with the saturated fatty acid is carried out with an ester of the unsaturated fatty acid as defined above.

The unsaturated ester that may be used in implementation as a reactant is preferably an ester of at least one unsaturated fatty acid as defined above and of at least one alcohol containing from 1 to 16 carbon atoms.

Preferably, the unsaturated ester used in implementing the method of the invention comprises no other functional group other than the ester functional group and the carbon-carbon double bond.

According to one embodiment, the alcohol optionally used to esterify the unsaturated fatty acid corresponds to the formula (4):

R3-OH [Chem 4]

in which R3 represents a monovalent alkyl radical, either linear or branched, containing from 1 to 16 atoms of carbon, preferably from 1 to 12 carbon atoms, advantageously from 1 to 10 carbon atoms.

According to one embodiment, the alcohol is a primary or secondary alcohol containing from 1 to 16 carbon atoms, preferably from 1 to 12 carbon atoms, advantageously from 1 to 10 carbon atoms.

According to one embodiment, the unsaturated ester is not 2-ethylhexyl oleate.

According to one embodiment of the invention, the unsaturated ester used in implementing the invention is an ester of at least one linear unsaturated fatty acid containing from 11 to 18 carbon atoms and of at least one linear saturated alcohol containing from 1 to 10 carbon atoms.

The unsaturated ester used in implementing the method of the invention may be a mixture of at least two different unsaturated esters.

If the method makes use of a mixture of at least two different unsaturated esters, the said mixture preferably comprises at least 70% by weight, more preferably at least 80% by weight, advantageously at least 85% by weight, of a same given ester and/or of the isomer thereof, relative to the total weight of the mixture of at least two different unsaturated esters.

If the method makes use of an unsaturated fatty acid ester, the unsaturated fatty acid may be esterified beforehand according to any esterification method that is well known to the person skilled in the art.

The unsaturated ester can thus be represented by the formula (5) or the formula (6) when it is obtained by reacting an acid having the formula (2) or an acid having the formula (3) with an alcohol having the formula (4), as defined above:

[Chem 5]

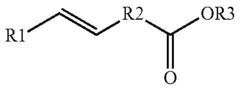

[Chem 6]

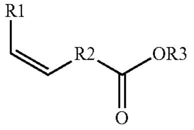

These two unsaturated esters may be used as reactants for the reaction of the invention in cis/trans equilibrium.

The unsaturated compound used in implementing the method of the invention may be derived from a synthetic or natural source, preferably a natural source, such as a plant or animal source. The alcohol optionally used to esterify the unsaturated compound when it is in acid form may also be derived from a natural source.

According to one embodiment, the fatty acid or ester thereof used as reactant in the method of the invention is commercially available in the form of plant or animal oil comprising, relative to the total weight of the plant or animal oil, preferably less than 8% by weight of polyunsaturated acids, preferably less than 5% by weight, or indeed even less than 3% by weight of polyunsaturated acids.

According to one particular embodiment of the invention, the fatty acid used in implementation as reactant in the method of the invention is derived from an oil that is rich in one or more monounsaturated compound(s), preferably, the method of the invention uses in implementation a composition of unsaturated compounds that is substantially or completely free of polyunsaturated compounds. Among the unsaturated compounds from plant-based sources, it is possible to select the acids or esters of the following oils: pine (commonly referred to as tall oil), rapeseed, sunflower, castor, peanut, flax, copra, olive, palm, cotton, corn, tallow, lard, palm kernel, soya, pumpkin, grapeseed, argan, jojoba, sesame, walnut, hazelnut, tung tree (or China wood oil), rice, as well as oils of the same type derived from hybrid or genetically modified species.

Among the unsaturated compounds from animal sources, mention may be made of the acids and esters of fats from marine animals, fish or marine mammals, and the fats of land animals such as beef tallow, equine and pork fats.

Also preferred are triglycerides and other esters of the following oils: sunflower, castor, soybean and rapeseed, including hybrids or genetically modified species thereof. The oil may be treated, for example hydrocracked, in order to obtain the desired chain lengths.

The method according to the invention may optionally include a preliminary step of providing the unsaturated compound consisting of an optionally hydrocracked plant or animal oil, comprising, relative to the total weight of the plant or animal oil, preferably less than 8% by weight of polyunsaturated acids, preferably less than 5% by weight, or indeed even less than 3% by weight of polyunsaturated acids.

In one particularly preferred embodiment, the unsaturated compounds used in implementing the method comprise at least one monounsaturated fatty acid, preferably the monounsaturated fatty acids represent at least 70% by weight, more preferably at least 80% by weight, or indeed even at least 85% by weight, of the total weight of the unsaturated compounds used as reactant in implementing the method. According to one embodiment, the unsaturated compound is selected from among unsaturated fatty acids containing 11 carbon atoms having a double bond in the terminal position, and unsaturated fatty acids containing from 13 to 18 carbon atoms.

Saturated Fatty Acid

The method of the invention makes use of at least one saturated fatty acid containing from 4 to 18 carbon atoms, as a reactant in order to induce reaction on the carbon-carbon double bond of the unsaturated fatty acid or ester thereof.

Preferably, the saturated fatty acid is a monosaturated fatty acid.

According to one embodiment, the saturated fatty acid corresponds to the formula (7):

[Chem 7]

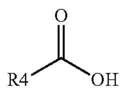

in which R4 represents a monovalent alkyl radical, either linear or branched, containing from 5 to 17 carbon atoms; preferably a linear or branched alkyl containing from 6 to 12 carbon atoms; advantageously a linear alkyl containing from 7 to 12 carbon atoms.

The saturated fatty acid may be a fatty acid that is linear or branched, preferably linear.

Preferably, the saturated fatty acid contains from 7 to 12 carbon atoms. This chain length makes it possible to further optimise the cold properties of the estolide composition resulting from the method.

According to one embodiment, the saturated fatty acid used in implementing the invention is selected from among octanoic acid, nonanoic acid, decanoic acid, undecanoic acid, lauric acid and mixtures thereof; preferably from among octanoic acid, nonanoic acid, decanoic acid, undecanoic acid and mixtures thereof.

The method according to the invention may use in implementation a single saturated fatty acid or a mixture of a plurality of saturated fatty acids. Preferably, the method according to the invention uses a single saturated fatty acid.

It is also possible to envisage using in implementation a mixture of at least two different saturated fatty acids. The proportions may be adjusted according to the desired properties being sought for the composition of estolides.

The saturated fatty acid is widely available commercially and may be derived from a synthetic or natural source, preferably a natural source.

Catalyst

The method of the invention uses in implementation at least one catalyst comprising one or more sulphonic acid functional groups.

Within the meaning of the present invention, the sulphonic acid functional group is other than a sulphonate functional group.

The catalyst used in implementing the invention may also include one or more fluorine atoms.

Preferably, the sulfur atom of the sulphonic acid functional group of the catalyst used in implementing the invention is not bonded to an aromatic carbon atom; in particular according to one preferred embodiment, the sulfur atom of the sulphonic acid functional group of the catalyst is not bonded to a carbon atom of a ring such as a naphthalene type ring.

According to one embodiment, the catalyst is selected from among:

- a catalyst having the formula $RSO_3H$, optionally supported, where R is a hydrogen atom or a linear, branched or cyclic hydrocarbon radical having from 1 to 18 carbon atoms, optionally substituted by one or more heteroatoms, for example of a type such as nitrogen, fluorine, oxygen, sulfur or silicon, it being possible for the catalyst support to be selected from silica, alumina, preferably silica, and
- a catalyst in the form of a polymer having the formula (1):

[Chem 1]

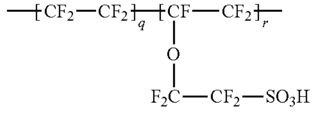

in which q and r represent independently of each other a non-zero number ranging from 1 to 15.

According to one embodiment, in the formula (1) above, q represents an integer ranging from 2 to 10, preferably from 3 to 8, and r represents an integer ranging from 1 to 3.

According to one embodiment, in the formula $RSO_3H$ above, R represents a hydrogen atom, or a linear or branched alkyl or alkenyl radical, a cycloalkyl radical, the said radicals preferably having from 1 to 12 carbon atoms, the said radicals being optionally substituted by one or more fluorine atoms and/or oxygen atoms.

According to one embodiment, the catalyst used in implementing the invention contains a single sulphonic acid functional group, from 1 to 4 carbon atoms, and from 2 to 9 fluorine atoms. According to one preferred embodiment, the catalyst used in implementing the invention is triflic acid (trifluoromethanesulfonic acid), optionally supported, for example on silica or alumina, preferably silica.

A catalyst supported, for example on silica or alumina, presents the advantage of being able to be recycled at the end of the method, for example after filtration (for example on sintered media), rinsing (with a solvent for example of such type as 1,2-dichloroethane), and drying (for example under a nitrogen atmosphere). The catalyst thus recycled may be used to catalyse another reaction.

According to one particular embodiment, the catalyst used in implementing the invention is selected from triflic acid, triflic acid supported on silica, p-toluenesulfonic acid, methanesulfonic acid, nonafluorobutanesulfonic acid or a catalyst having the formula (1) in which q ranges from 3 to 8 and r from 1 to 2.

The catalysts that are able to be used in implementing the invention may be commercially available.

The catalyst used in implementing the invention may be a homogeneous catalyst or a heterogeneous catalyst.

When it is a heterogeneous catalyst, it may be a catalyst in the form of a polymer (example of the catalyst having the formula (1)) or a catalyst supported on a material which may be selected from alumina, silica, etc (example of the supported catalyst having the formula $RSO_3H$).

According to one embodiment, the method of the invention optionally includes a separation step for separating the catalyst from the estolide composition thus obtained.

According to one preferred embodiment of the invention, the method makes use of a single catalyst. In other words, preferably, the catalyst comprising at least one sulphonic acid functional group as defined in the invention will be the sole catalyst of the system during the reaction between the unsaturated ester and the saturated fatty acid. Preferably, the catalyst of the invention does not comprise any metal atom, in particular no iron, nickel, cobalt or bismuth atoms.

According to one particular embodiment, the catalyst is not a triflate catalyst and/or the catalyst does not comprise triflate.

Implementation of the Method

The method according to the invention comprises the reacting of the ester and/or the unsaturated acid with the saturated fatty acid. The method typically leads to an addition reaction between the acid functional group of the saturated fatty acid and the carbon-carbon double bond of the unsaturated compound in acid or ester form in order to form at least one estolide.

The method of the invention makes it possible in particular to obtain, at the end of the reaction between the unsaturated compound and the saturated fatty acid, a composition of estolides comprising mainly monoestolides; in particular, the resulting estolide composition obtained at the conclusion of the method of the invention typically comprises at least 80% by weight, advantageously at least 90% by weight of monoestolides, relative to the total weight of the composition resulting from the method.

Typically, the method according to the invention leads to a mixture of at least two positional isomers of monoestolides. In effect, the saturated fatty acid is able to react on either one of the carbon atoms of the carbon-carbon double bond of the unsaturated compound, which then leads to two positional isomers of monoestolides. Also, a part of the unsaturated compounds may be isomerised, such that the carbon-carbon double bond can change position for a part of the unsaturated compounds. It should be noted that in the case where the carbon-carbon double bond is in the terminal position, the saturated fatty acid will react mainly on the carbon atom which will not be in the terminal position, with it however being possible for part of the unsaturated compounds to be isomerised, which will also lead to positional isomers.

The monoestolides obtained as a result on conclusion of the method may be in the form of acid monoestolide (for example when the unsaturated reactant is in the form of an unsaturated acid) and/or of ester monoestolide (for example when the unsaturated reactant is in the form of an unsaturated acid ester). Preferably, the unsaturated compound is an unsaturated acid and the monoestolides obtained as a result on conclusion of the addition reaction between the unsaturated acid and the saturated acid are then in the form of an acid monoestolide.

Preferably, the method according to the invention does not include the steps: (i) mixing of 1 equivalent of 2-ethylhexyl oleate with 6 equivalents of lauric acid in the presence of 0.25 equivalent of triflic acid, typically under nitrogen atmosphere in a reactor equipped with a stirrer, followed by (ii) heating at 60° C. for 24 hours of the mixture from step (i).

Preferably, when the unsaturated compound is in ester form, the said unsaturated ester is other than 2-ethylhexyl oleate and/or the saturated fatty acid is other than lauric acid. Preferentially, the said unsaturated ester is other than 2-ethylhexyl oleate and the saturated fatty acid is other than lauric acid.

The method according to the invention may optionally also include an esterification step for esterifying the acid monoestolides expected to be obtained. If the unsaturated compound at the start comprises a mixture of acid and ester, the resulting estolide composition obtained on conclusion of the method of the invention may comprise a mixture of estolides in acid form and in ester form. A subsequent esterification process may then be needed/useful in order to esterify the estolides in acid form.

The esterification step may be implemented according to any method that is well known to the person skilled in the art. Typically, the esterification of acid monoestolides is carried out using at least one alcohol having from 1 to 16 carbon atoms, preferably from 1 to 12 carbon atoms, or even from 1 to 10 carbon atoms. Preferably, the said alcohol corresponds to the formula (4) defined above.

The monoestolides that are obtainable as a result of the method may be represented by the formula (8) or the formula (9):

[Chem 8]

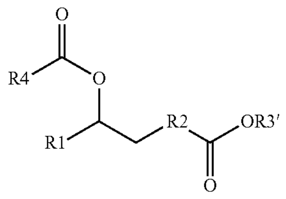

[Chem 9]

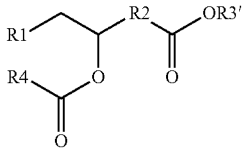

wherein:

R1, R2 and R4 have the same definition as in the formulas (2), (3) and (7);

R3' may be identical to R3 as defined in the formula (4) above, or R3' may be a hydrogen atom;

as well as by their positional isomers, in which the —OOCR4 unit may be branched at different positions on the alkyl chain of the unsaturated compound.

Indeed, the starting unsaturated compound may comprise positional isomers of the compounds illustrated by the formulas (2) and (3) above. Consequently, the estolides obtained may also comprise positional isomers of the compounds illustrated by the formulas (8) and (9) above.

Preferably, the method according to the invention does not include any subsequent hydrogenation step of hydrogenating the resulting composition of estolides obtained on conclusion of the method.

The compounds defined by the formulas (8) and (9) are two positional isomers. When R3' is a hydrogen atom, it will be referred to as acid monoestolide, and when R3' is other than a hydrogen atom, for example is as defined for R3, it will then be referred to as ester monoestolide.

According to one embodiment of the invention, the method according to the invention makes it possible to obtain monoestolides having the formula (8) and monoestolides having the formula (9).

According to one embodiment, in the formulas (8) and (9):

R4 is other than an undecyl group, and

R3 is other than a 2-ethylhexyl group, and

R2 is other than a heptyl group divalent, and

R1 is other than an octyl group.

The allusion to "composition resulting from the method", appropriately takes into consideration the reactants, the products, as well as the by-products of the reaction. The catalyst is not taken into consideration when designating the composition resulting from the method. Thus, it will generally be necessary to separate the catalyst from the reaction medium in order to obtain the estolide composition resulting from the method.

According to one embodiment of the invention, the reaction between the unsaturated acid or ester thereof and the saturated fatty acid is carried out at a temperature ranging from 20 to 120° C., preferably ranging from 30 to 100° C., advantageously ranging from 40 to 90° C. A higher temperature may favour the conversion but if the temperature is too high then the reaction selectivity in favour of the monoestolides may be degraded.

The method may be implemented in continuous, or semi-continuous, or batch mode.

According to one embodiment, the method of the invention implements a batch-wise addition of the unsaturated compound and the saturated acid (simultaneous addition of the entirety of reactants) or fractional addition (addition of a reactant in a fractional manner).

The particular embodiment with a fractional addition of one of the reactants, in particular of the unsaturated ester, makes it possible to reduce or even eliminate the oligomerisation reactions that oligomerise the unsaturated ester.

According to one embodiment, the reacting of the unsaturated compound with the saturated fatty acid in the presence of the catalyst is carried out according to one or more of the following conditions:

- the molar ratio of the unsaturated compound to the saturated fatty acid ranges from 1/10 to 1/1, preferably from 1/8 to 1/4;
- the molar ratio of the unsaturated compound to the catalyst ranges from 1/0.1 to 1/1, preferably from 1/0.15 to 1/0.5.

The progression of the reaction may be monitored by gas chromatography coupled with a flame ionisation detector (GC-FID), according to methods known to the person skilled in the art.

Within the meaning of the present invention, the term 'conversion' refers to the quantity expressed in percentage by weight of the unsaturated compound(s) that has(have) reacted and the term 'selectivity' refers to the quantity expressed in percentage by weight of monoestolides formed relative to the total weight of the products formed (the calculation of selectivity thus does not take into account neither the reactants nor the catalyst).

The resulting composition of estolides obtained on conclusion of the method may also comprise by-products (also known as "secondary products"), for example polyestolides having the formula (10) or having the formula (11). According to one embodiment, the method according to the invention makes it possible to obtain polyestolides having the formula (10) and polyestolides having the formula (11). Other positional isomers of these polyestolides having the formula (10) and/or (11) may be formed.

[Chem 10]

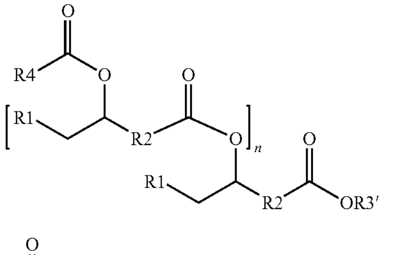

[Chem 11]

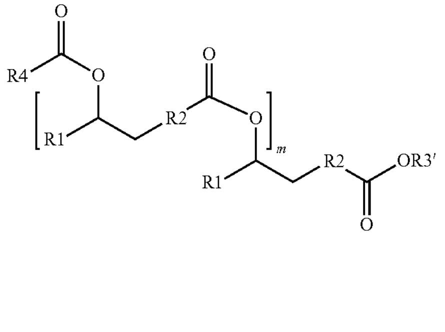

In which:

R1, R2 and R4 have the same definition as in the formulas (2), (3) and (7);

R3' may be identical to R3 as defined in the formula (4) above, or R3' may be a hydrogen atom;

n and m are independent of each other and other than zero, typically n and m may range from 1 to 4.

In addition to the very good selectivity towards monoestolides, the method according to the invention will make it possible to obtain polyestolides with a low number of addition reactions. In other words, at least 50% by weight, or even at least 70% by weight, or indeed even at least 90% by weight of the polyestolides which will possibly be obtained in the method of the invention will be polyestolides where n and m (estolide number) is equal to 1.

The resulting estolide composition obtained on conclusion of the method advantageously has a kinematic viscosity at 40° C. ranging from 5 to 100 $mm^2/s$, preferably from 10 to 50 $mm^2/s$, advantageously from 15 to 40 $mm^2/s$, measured according to ASTM D7042.

The resulting estolide composition obtained on conclusion of the method advantageously has an iodine number less than or equal to 13 g/100 g of iodine, preferably less than or equal to 12 g/100 g of iodine, advantageously less than or equal to 10 g/100 g of iodine. The method according to the invention is particularly advantageous in that it makes it possible to obtain a low iodine number, without a hydrogenation step. The iodine number may be measured for example according to standard NF EN ISO 3961.

The resulting estolide composition obtained on conclusion of the estolide formation reaction (addition reaction causing adding of saturated fatty acids on unsaturated fatty acids) typically comprises:

- from 80 to 99.9% by weight of monoestolide(s), and
- from 0.1 to 20% by weight of polyestolide(s),
- relative to the total weight of the estolides, the estolides including the monoestolides and the polyestolides.

It should be noted that the estolide composition may optionally comprise from 0.1 to 30% by weight of unreacted reactants or unsaturated esters possibly formed in situ during the esterification reaction causing esterification of the estolides, relative to the total weight of the estolide composition.

The method according to the invention may optionally further include, after the estolide formation reaction, a separation step in which the unreacted reactants of the types such as saturated fatty acid, unsaturated fatty acid and/or unsaturated fatty acid ester, are eliminated from the estolide composition. Within the meaning of the present invention, estolides are not reactants. When the unsaturated compound at the start is in acid form and estolides in acid form are obtained, the method may include a subsequent esterification step and in this case, unsaturated esters may be formed in situ. These unsaturated esters are not estolides within the meaning of the invention. The separation step that serves to enable separating the reactants may also enable separating these unsaturated esters possibly formed in situ during the esterification of the estolides.

This separation step for separating acids or esters (compounds which are not estolides) may induce imbalance in the respective proportions of monoestolides and polyestolides. Thus, whereas the estolide composition prior to this separation step for separating acids or esters comprises:

- from 80 to 99.9% by weight of monoestolide(s), and
- from 0.1 to 20% by weight of polyestolide(s),
- relative to the total weight of the estolides;

the estolide composition after the separation step for separating acids or esters may comprise:

from 65 to 99% by weight of monoestolide(s), and from 1 to 35% by weight of polyestolide(s), relative to the total weight of the estolides.

Composition of Estolides

The object of the present invention also relates to a composition of estolides as such and a composition of estolides that is obtainable by the method of the invention.

The estolide composition according to the invention typically comprises:

from 65 to 99.9% by weight, preferably from 70 to 95% by weight, more preferably from 75 to 90% by weight, of monoestolide(s); and from 0.1 to 35% by weight, preferably from 5 to 30% by weight, more preferably from 10 to 25% by weight, of polyestolide(s);

relative to the total weight of the estolides.

The estolide composition according to the invention advantageously has a kinematic viscosity at 40° C. ranging from 5 to 100 $mm^2/s$, preferably from 10 to 50 $mm^2/s$, advantageously from 15 to 40 $mm^2/s$, measured according to the standard ASTM D7042.

The estolide composition according to the invention advantageously has an iodine number less than or equal to 13 g/100 g of iodine, preferably less than or equal to 12 g/100 g of iodine, advantageously less than or equal to 10 g/100 g of iodine. The method according to the invention is particularly advantageous in that it makes it possible to obtain a low iodine number, without a hydrogenation step.

According to one embodiment, the estolide composition comprises:

from 50 to 99.8% by weight, preferably from 55 to 90% by weight, more preferably from 55 to 80% by weight, of monoestolide(s);

from 0.1 to 30% by weight, preferably from 5 to 25% by weight, more preferably from 10 to 25% by weight, of polyestolide(s); and from 0.1 to 30% by weight, preferably from 1 to 25% by weight, more preferably from 5 to 25% by weight, of ester(s) selected from among the unsaturated fatty acid esters and the saturated fatty acid esters that may result from transesterification of the unsaturated ester with the saturated fatty acid;

relative to the total weight of the estolide composition.

According to one embodiment of the invention, the estolide composition comprises:

from 65 to 99.9% by weight, preferably from 70 to 95% by weight, more preferably from 75 to 90% by weight, of monoestolides replying to the formula (8) and/or to the formula (9); and from 0.1 to 35% by weight, preferably from 5 to 30% by weight, more preferably from 10 to 25% by weight, of polyestolides replying to the formula (10) and/or to the formula (11);

relative to the total weight of the estolides.

According to one embodiment of the invention, the estolide composition comprises:

from 50 to 99.8% by weight, preferably from 55 to 90% by weight, more preferably from 55 to 80% by weight, of monoestolides replying to the formula (8) and/or to the formula (9); and from 0.1 to 30% by weight, preferably from 5 to 25% by weight, more preferably from 10 to 25% by weight, of polyestolides replying to the formula (10) and/or to one or more of the positional isomers thereof (for example having the formula (11)), preferably in which n is equal to 1;

from 0.1 to 30% by weight, preferably from 1 to 25% by weight, more preferably from 5 to 25% by weight, of a saturated fatty acid ester resulting from a transesterification reaction causing transesterification of an unsaturated ester having the formula (5) and/or (6) with a saturated fatty acid having the formula (7);

relative to the total weight of the estolide composition.

According to one embodiment of the invention, the estolide composition comprises:

from 65 to 99.9% by weight, preferably from 70 to 95% by weight, more preferably from 75 to 90% by weight, of monoestolides, the said monoestolides comprising at least monoestolides having the formula (8) and monoestolides having the formula (9); and from 0.1 to 35% by weight, preferably from 5 to 30% by weight, more preferably from 10 to 25% by weight of polyestolides, the said polyestolides comprising at least polyestolides having the formula (10) and polyestolides having the formula (11);

relative to the total weight of the estolides.

According to one preferred embodiment, the estolides of the estolide composition according to the invention are in ester form. When the estolides of the estolide composition according to the invention reply to the formulas (8), (9), (10) and/or (11) (or to the positional isomers of these formulas), preferably, the radical R3' is identical to R3, i.e. it represents a monovalent alkyl radical, either linear or branched, containing from 1 to 16 carbon atoms, preferably from 1 to 12 carbon atoms, advantageously from 1 to 10 carbon atoms.

According to one embodiment, in the formulas (8), (9), (10) and/or (11):

R4 is other than an undecyl group, and

R3 is other than a 2-ethylhexyl group, and

R2 is other than a divalent heptyl group, and

R1 is other than an octyl group.

Uses

The method according to the invention makes it possible to obtain an estolide composition having a high selectivity in favour of monoestolide. The estolide composition according to the invention may thus be used as base oil in a lubricating composition. The estolide composition may be used in a lubricating composition, without needing a prior distillation step for separating the monoestolides from the polyestolides, following the addition reaction as defined in the method of the invention.

Preferably, the estolides of the estolide composition according to the invention are in the ester form for the use thereof as base oil in a lubricating composition. If necessary, an esterification step for esterifying the resulting estolide composition obtained at the end of the method may be provided for in order to esterify the acid estolides. The esterification step may be implemented according to any method that is well known to the person skilled in the art. Typically, the esterification of acid monoestolides is carried out by making use of at least one alcohol having from 1 to 16 carbon atoms, preferably from 1 to 12 carbon atoms, or indeed even from 1 to 10 carbon atoms. Preferably, the said alcohol corresponds to the formula (4) defined above.

The estolide composition may be used in a lubricating composition as the sole base oil, but advantageously in combination with some other base oil. The term “other base oil” should be understood to refer to a base oil other than estolides.

The lubricating composition comprising the estolide composition according to the invention may be used to lubricate the various parts of a vehicle, in particular the various parts of an engine, or of a vehicle transmission, or the various parts of a marine engine or of industrial machinery engine, for example for civil engineering.

Lubricating Composition

The object of the invention also relates to a lubricating composition comprising the estolide composition according to the invention and at least one additive and/or at least one other base oil, the estolides of the estolide composition according to the invention being in the ester form.

As described above, an esterification step for esterifying the resulting estolide composition obtained at the end of the method according to the invention may be provided for in order to esterify the acid estolides, such an esterification may be provided for if the method of the invention uses in implementation an unsaturated acid as a reactant.

These other base oils may be selected from the base oils conventionally used in the field of lubricating oils, such as mineral, synthetic or natural, animal or plant oils, or mixtures thereof.

The other base oils of the lubricating compositions according to the invention may in particular be oils of mineral or synthetic origin belonging to groups I to V according to the classes as defined in the API classification (or the equivalents thereof according to the Technical Association of the European Lubricants Industry, ATIEL classification) and presented in Table 1 below, or mixtures thereof.

TABLE 1

| | Saturates Content (by weight) | Sulfur Content (by weight) | Viscosity Index (VI) |
|---|---|---|---|
| Group I Mineral Oils | <90% | >0.03% | 80 ≤ VI < 120 |
| Group II Hydrocracked Oils | ≥90% | ≤0% | 80 ≤ VI < 120 |
| Group III Hydrocracked or Hydro-Isomerised Oils | ≥90% | ≤0.03% | ≥120 |
| Group IV | Polyalphaolefins (PAO) | | |
| Group V | Esters and other bases not included in groups I to IV | | |

The other mineral-based oils include all types of base oils obtained by atmospheric and vacuum distillation of crude oil, followed by refining operations such as solvent extraction, deasphalting, solvent dewaxing, hydrotreating, hydrocracking, hydroisomerisation and hydrofinishing.

Blends of synthetic and mineral oils, which may be biosourced, may also be used.

The other base oils of the lubricating compositions according to the invention may also be selected from synthetic oils, such as certain esters of carboxylic acids and alcohols, polyalphaolefins (PAO), and polyalkylene glycol (PAG) obtained by polymerisation or copolymerisation of alkylene oxides containing from 2 to 8 carbon atoms, in particular from 2 to 4 carbon atoms.

The PAOs used as other base oils are for example obtained from monomers containing from 4 to 32 carbon atoms, for example from octene or decene. The weight average molecular weight (ie mass average molar mass) of PAO may vary quite widely. Preferably, the weight average molecular weight of the PAO is less than 600 Da. The weight average molecular weight of the PAO may also range from 100 to 600 Da, from 150 to 600 Da, or even from 200 to 600 Da.

Advantageously, the one or more other base oil(s) of the lubricating composition according to the invention are selected from among polyalphaolefins (PAO), polyalkylene glycols (PAG), and esters of carboxylic acids and alcohols.

According to an alternative embodiment, the one or more other base oil(s) of the lubricating composition according to the invention may be selected from the base oils of group II or III.

It is up to a person skilled in the art to adjust the content level of the base oil to be used in implementation in a lubricating composition.

According to one embodiment, the lubricating composition according to the invention comprises:

from 5 to 95% by weight, preferably from 10 to 70% by weight, advantageously from 15 to 50% by weight, of the estolide composition according to invention; and from 5 to 95% by weight, preferably from 30 to 90% by weight, advantageously from 50 to 85% by weight, of one or more other base oil(s);

relative to the total weight of the lubricating composition according to the invention.

According to one embodiment, the one or more additive(s) of the lubricating composition are selected from among friction modifiers, detergents, anti-wear additives, extreme pressure additives, dispersants, antioxidants, pour point depressants, antifoaming agents, and mixtures thereof. These additives are well known to the person skilled in the art in the field of mechanical parts lubrication.

These additives may be introduced individually and/or in the form of a blend/mixture quite similar to those already available for sale for the formulations of commercial lubricants for vehicle engines, with a performance level as defined by the European Automobile Manufacturers' Association (ACEA) and/or the American Petroleum Institute (API), well known to the person skilled in the art.

A lubricating composition according to the invention may comprise at least one friction modifier additive. The friction modifier additive may be selected from a compound providing metal elements and an ash-free compound. Among the compounds providing metal elements, mention may be made of complexes of transition metals such as Mo, Sb, Sn, Fe, Cu, Zn, the ligands of which may be hydrocarbon compounds comprising oxygen, nitrogen, sulfur or phosphorus. The ash-free friction modifier additives are generally derived from organic sources and may be selected from among monoesters of fatty acids and polyols, alkoxylated amines, alkoxylated fatty amines, fatty epoxides, borate fatty epoxides; fatty amines, or fatty acid glycerol esters. According to the invention, the fatty compounds comprise at least one hydrocarbon group containing from 10 to 24 carbon atoms.

A lubricating composition according to the invention may comprise from 0.01 to 2% by weight, or from 0.01 to 5% by weight, preferably from 0.1 to 1.5% by weight, or from 0.1 to 2% by weight of friction modifier additive, relative to the total weight of the lubricating composition.

A lubricating composition implemented according to the invention may comprise at least one antioxidant additive.

The antioxidant additive generally provides the means to delay the degradation of the composition during use in operation. This degradation may in particular result in the formation of deposits, in the presence of sludge, or in an increase in the viscosity of the composition.

The antioxidant additives act in particular as free radical inhibitors or hydroperoxide destroyers. Among the antioxidant additives that are commonly used, mention may be made of such types as for example phenolic antioxidant additives, amine antioxidant additives, phospho-sulfur antioxidant additives. Certain of these antioxidant additives, for example phospho-sulfur antioxidant additives, may be ash generators. The phenolic antioxidant additives may be ash-free or indeed may be in the form of basic or neutral metal salts. The antioxidant additives may in particular be selected from among sterically hindered phenols, sterically hindered phenol esters, and sterically hindered phenols comprising a thioether bridge, diphenylamines, diphenylamines substituted with at least one C1-C12 alkyl group, N,N'-dialkyl-aryl-diamines and mixtures thereof.

Preferably according to the invention, the sterically hindered phenols are selected from among compounds comprising a phenol group of which at least one carbon that is vicinal to the carbon bearing the alcohol functional group is substituted by at least one C1-C10 alkyl group, preferably a C1-C6 alkyl group, preferably a C4 alkyl group, preferably by the tert-butyl group.

Amino compounds are another class of antioxidant additives that may be used, possibly in combination with the phenolic antioxidant additives. Examples of amino compounds are aromatic amines, for example aromatic amines having the formula NQ1Q2Q3 in which Q1 represents an aliphatic group or an optionally substituted aromatic group; Q2 represents an optionally substituted aromatic group; Q3 represents a hydrogen atom, an alkyl group, an aryl group, or a group having the formula Q4S(O)ZQ5 in which Q4 represents an alkylene group or an alkenylene group; Q5 represents an alkyl group, an alkenyl group, or an aryl group; and z represents 0, 1 or 2

Sulfurised alkyl phenols or the alkali and alkaline earth metal salts thereof may also be used as antioxidant additives.

Another class of antioxidant additives is the class of copper compounds, for example copper thio- or dithio-phosphates, salts of copper and of carboxylic acids, dithio-carbamates, sulphonates, phenates, copper acetylacetonates. Copper I and II salts, salts of succinic acid or succinic anhydride may also be used.

A lubricating composition according to the invention may contain all types of antioxidant additives known to the person skilled in the art.

Advantageously, a lubricating composition according to the invention comprises at least one ash-free antioxidant additive.

A lubricating composition according to the invention may comprise from 0.5 to 2% by weight of at least one antioxidant additive, relative to the total weight of the composition.

A lubricating composition according to the invention can also comprise at least one detergent additive.

Detergent additives generally provide the means to reduce the formation of deposits on the surface of metal parts by dissolving the secondary products of oxidation and combustion.

The detergent additives which may be used in a lubricating composition according to the invention are generally known to the person skilled in the art. The detergent additives may be anionic compounds comprising a long lipophilic hydrocarbon chain and a hydrophilic head. The associated cation may be a metal cation of an alkali or alkaline earth metal.

The detergent additives are preferably selected from among alkali metal salts or alkaline-earth metal salts of carboxylic acids, sulfonates, salicylates, naphthenates, as well as phenate salts. The alkali and alkaline-earth metals are preferably calcium, magnesium, sodium or barium.

These metal salts generally comprise the metal in a stoichiometric quantity or else in excess, therefore in a quantity greater than the stoichiometric quantity. These are then overbased detergent additives; the excess metal contributing the overbased character to the detergent additive is then generally in the form of an oil-insoluble metal salt, for example a carbonate, a hydroxide, an oxalate, an acetate, a glutamate, preferentially a carbonate.

A lubricating composition according to the invention may for example comprise from 2 to 4% by weight of detergent additive, relative to the total weight of the composition.

Also, a lubricating composition according to the invention may comprise at least one dispersing agent, which is separate from the compounds of such type as succinimide as defined according to the invention.

The dispersing agent may be selected from Mannich bases, succinimides, for example of such type as polyisobutylene succinimide.

A lubricating composition implemented according to the invention may for example comprise from 0.2 to 10% by weight of one or more dispersing agent(s) which is(are) separate from the compounds of such type as succinimide as defined according to the invention, relative to the total weight of the composition.

A lubricating composition according to the invention may additionally also comprise at least one anti-wear and/or extreme-pressure agent.

There are a wide variety of existing anti-wear additives. Preferably, for the lubricating composition according to the invention, the anti-wear additives are selected from among phospho-sulfur additives such as metal alkylthiophosphates, in particular zinc alkylthiophosphates, and more specifically zinc dialkyldithiophosphates or ZnDTP. The preferred compounds are those having the formula Zn((SP(S)(OQ6)(OQ7))2, in which Q6 and Q7, which may be identical or different, independently represent an alkyl group, preferentially an alkyl group containing from 1 to 18 carbon atoms.

Amine phosphates are also anti-wear additives which may be used in a composition according to the invention. However, the phosphorus provided by these additives may act as a poisonous substance for the catalytic systems of automobiles because these additives are ash generators. These effects may be minimised by partially substituting the amine phosphates with additives that do not provide phosphorus, such as, for example, polysulphides, in particular sulfur-containing olefins.

A lubricating composition according to the invention may comprise from 0.01 to 15% by weight, preferably from 0.1 to 10% by weight, preferentially from 1 to 5% by weight of anti-wear agent(s), relative to the total weight of the composition A lubricating composition according to the invention may further comprise at least one antifoaming agent.

The antifoaming agent may be selected from polyacrylates, polysiloxanes or hybrids thereof.

A lubricating composition according to the invention may comprise from 0.01 to 2% by mass, or from 0.01 to 5% by mass; preferably from 0.1 to 1.5% by mass, or from 0.1 to 2% by mass of antifoaming agent; relative to the total weight of the composition.

A lubricating composition suitable for the invention may also comprise at least one pour point depressant additive, accordingly also referred to as “PPD” (for “Pour Point Depressant”) agents.

By slowing down the formation of paraffin crystals, pour point depressants generally ameliorate the cold behaviour of the composition. By way of examples of pour point depressant additives, mention may be made of alkyl polymethacrylates, polyacrylates, polyarylamides, polyalkylphenols, polyalkylnaphthalenes and alkylated polystyrenes.

The lubricating composition according to the invention may comprise:

- from 5 to 94.9% by weight, preferably from 10 to 70% by weight, advantageously from 15 to 50% by weight, of the estolide composition according to the invention; and
- from 5 to 94.9% by weight, preferably from 30 to 90% by weight, advantageously from 50 to 85% by weight, of one or more other base oils,
- from 0.1 to 15% by weight, preferably from 0.5 to 10% by weight, advantageously from 1 to 5% by weight of one or more additives selected from among friction modifiers, viscosity index modifiers, detergents, dispersants, anti-wear and/or extreme pressure additives, antioxidants, pour point depressants, anti-foaming agents and mixtures thereof,
- relative to the total weight of the lubricating composition according to the invention.

The lubricating composition according to the invention may be obtained by mixing the constituents of the lubricating composition. The present invention also relates to a method for preparing a lubricating composition comprising the following steps:

- preparation of an estolide composition according to the method described above; and
- mixing of at least one other base oil and/or at least one additive with the composition of estolides.

Preferably, the method for preparing a lubricating composition according to the invention does not include an intermediate separation step of separating the products formed during the step of preparing the composition of estolides, prior to the mixing step. Preferably, the method for preparing a lubricating composition according to the invention does not include a hydrogenation step, in particular for hydrogenating the resulting estolide composition obtained at the end of the step for preparing the estolide composition.

The one or more other base oil(s) and the one or more additive(s) used in implementing the composition preparation method for preparing the lubricating composition may have one or more of the characteristic feature(s) described above in the context of the lubricating composition of the invention.

The lubricating composition obtained by this preparation method may exhibit one or more of the characteristic feature(s) described above in the context of the lubricating composition according to the invention.

EXAMPLES

In the remainder of this description, examples are given by way of illustration of the present invention and are in no way intended to limit the scope thereof.

The term 'conversion' corresponds to the proportion expressed in percentage by weight of the starting unsaturated compound that has reacted.

The selectivity to monoestolides corresponds to the proportion expressed in percentage by weight of monoestolides obtained in the composition of estolides resulting from the method.

Example 1 Implementation of a Method According to the Invention

In this example, the addition reaction is carried out between an oleic acid (unsaturated compound) and nonanoic acid (saturated fatty acid). The oleic acid is derived from a plant oil having an oleic acid content greater than 80% by weight and a content of polyunsaturated compounds less than 1% by weight.

The method is carried out for a period of 8 hours in total, after a batch addition (non-fractionated) of the two reactants.

The temperature and the molar ratios of unsaturated compound/saturated acid/catalyst are indicated in Table 2 below.

Multiple catalysts were tested:

- cata.1: catalyst, from the commercially available Aquivion® range, in the form of a polymer having the formula (8) in which q represents an integer ranging from 3 to 8, and r is an integer ranging from 1 to 2;
- cata.2: triflic acid (commercially available catalyst).

The results in terms of rates of conversion of the unsaturated compound and selectivity towards monoestolides are indicated in Table 2 below.

TABLE 2

| | Catalyst | Molar Ratio of Unsaturated Compound/Saturated Acid/Catalyst | T (° C.) | Conversion of Unsaturated Compound | Selectivity to Monoestolide |
|---|---|---|---|---|---|
| CI1 | Cata.1 | 1/6/0.25 | 80 | 61% | 95% |
| CI2 | Cata.1 | 1/6/0, 1 | 80 | 60% | 95% |
| CI3 | Cata.2 | 1/6/0.05 | 60 | 64% | 91% |
| CI4 | Cata.2 | 1/6/0.1 | 60 | 73% | 91% |
| CI5 | Cata.2 | 1/6/0.15 | 60 | 75% | 93% |
| CI6 | Cata.2 | 1/6/0.2 | 60 | 78% | 91% |
| CI7 | Cata.2 | 1/6/0.25 | 60 | 77% | 89% |
| CI8 | Cata.2 | 1/3/0.25 | 60 | 72% | 84% |
| CI9 | Cata.2 | 1/4/0.15 | 60 | 72% | 89% |

These examples show that the method according to the invention makes it possible to obtain both very good selectivity towards monoestolides and very good conversion rates.

The acid monoestolide that is predominantly obtained corresponds to the formula (12) and/or to the formula (13):

[Chem 12]

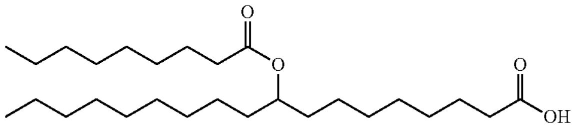

[Chem 13]

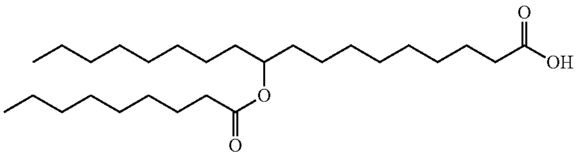

Among the acid monoestolides that may be formed, positional isomers of these two formulas (12) and (13) may also be obtained. Indeed, the nonanoic acid may be branched on another carbon atom of the hydrocarbon chain of the oleic acid.

The polyestolides that are predominantly formed correspond to the formula (14). Other polyestolides may be formed and then correspond to the positional isomers having the formula (14).

[Chem 14]

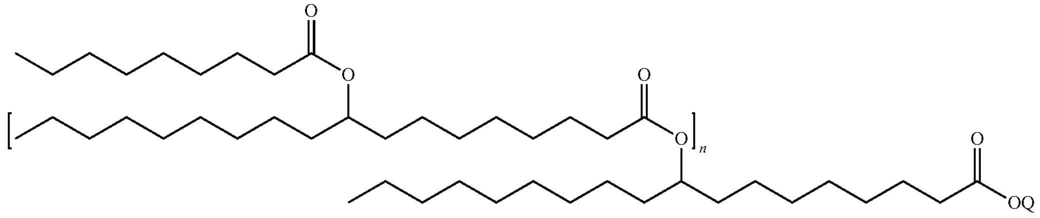

where Q is a hydrogen atom since the unsaturated compound was in acid form and where n ranges from 1 to 2 with a large majority of n being equal to 1 (at least 90% by weight of polyestolides are polyestolides where n is equal to 1, that is to say, polyestolides obtained by two addition reactions).

The estolide composition CI7 comprises, at the end of the addition reaction (prior to any separation step):

63% by weight of monoestolides in acid form;

12% by weight of polyestolides in acid form;

25% by weight of unreacted reactants (of such type as oleic acid or oleate);

relative to the total weight of the estolide composition.

The progression of the reaction may be monitored by gas chromatography coupled with a flame ionisation detector (GC-FID), for example with a DB5-HT column, according to methods that are well known to the person skilled in the art. The rates of conversion and selectivity may thus be determined.

Example 2: Implementation of Another Method According to the Invention

In this example, the addition reaction is carried out between an oleic acid methyl ester (unsaturated compound) and nonanoic acid (saturated fatty acid). The oleic acid methyl ester is derived from a plant oil having an oleic acid content greater than 80% by weight and a content of polyunsaturated compounds less than 1% by weight.

The method is carried out for a period of 8 hours in total, after a batch addition (non-fractional) of the two reactants.

The temperature and the molar ratios of unsaturated compound/saturated acid/catalyst are indicated in Table 3 below.

The catalyst tested in this example is triflic acid (commercially available catalyst), named cata.2 in Table 3.

The results in terms of rates of conversion of the unsaturated compound and selectivity towards monoestolides are indicated in Table 3 below.

TABLE 3

| | Catalyst | Molar Ratio of Unsaturated Compound/Saturated Acid/Catalyst | T (° C.) | Conversion of Unsaturated Compound | Selectivity to Monoestolide |
|---|---|---|---|---|---|
| CI10 | Cata.2 | 1/6/0.5 | 60 | 81% | 77% |
| CI11 | Cata.2 | 1/6/1 | 60 | 83% | 76% |

These two examples show that the method of the invention makes it possible to obtain both good selectivity towards monoestolides and good conversion rates.

In this example, in particular monoestolides are obtained in ester form, corresponding to the formula (15) and/or to the formula (16)

[Chem 15]

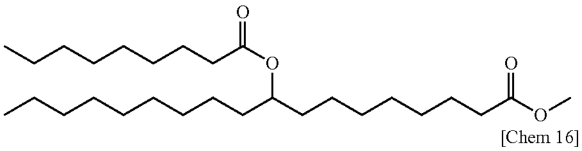

[Chem 16]

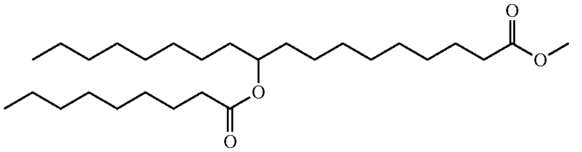

Among the ester monoestolides that may be formed, positional isomers of these two formulas (15) and (16) may also be obtained. Indeed, the nonanoic acid may be branched on another carbon atom of the hydrocarbon chain of the oleic acid ester.

Example 3: Comparative Catalysts

Experiments similar to that of Example 2 were carried out but with other commercially available catalysts, and under conditions detailed in Table 4 below.

Table 4 below summarises the conditions and the results of the tests carried out with the following catalysts: copper triflate $Cu(OTf)_2$, iron triflate $Fe(OTf)_3$, bismuth triflate $Bi(OTf)_3$, and perchloric acid. These four catalysts were used in implementation under conditions corresponding to the best conditions for implementation thereof.

TABLE 4

| | Catalyst | T (° C.) | Molar Ratio of Unsaturated Compound/ Saturated Acid/Catalyt | Conversion of Unsaturated Compound | Selectivity to Monoestolide |
|---|---|---|---|---|---|
| CC1 | $Cu(OTf)_2$ | 80 | 1/1/0.25 | 36% | 3% |
| CC2 | $Fe(OTf)_3$ | 80 | 1/2/0.25 | 66% | 2% |
| CC3 | $Bi(OTf)_3$ | 80 | 1/2/0.25 | 63% | 4% |
| CC4 | Perchloric acid* | 60 | 1/2/0.05 | 93% | 17% |

*for this catalyst, the saturated acid used was a C12 acid

As illustrated in Table 4, these three catalysts are not selective towards the addition reaction causing adding of the saturated acid on the double bond of the unsaturated ester since the selectivity towards the monoestolide is very low (less than 5%).

It has been observed that in the presence of these triflate catalysts (outside the invention), the transesterification reaction predominates to the detriment of the estolide formation reaction.

As regards the example with a perchloric acid type catalyst, the conversion rate is good but the selectivity level is not satisfactory: the reaction results in polyestolides yields being extremely predominant and in particular it is observed that polyestolides are obtained having an EN of 3.1. The estolide number EN may be determined for example by 1H NMR.

Example 4: Implementation of Another Method According to the Invention

In this example, the addition reaction is carried out between a C11 monounsaturated monofatty acid (unsaturated compound) having one unsaturation in the terminal position and nonanoic acid (saturated fatty acid). The fatty acid is derived from a hydrocracked plant oil.

The method is carried out for a period of 8 hours in total, after a batch addition (non-fractionated) of the two reactants.

The temperature and the molar ratios of unsaturated compound/saturated acid/catalyst are indicated in Table 5 below.

Multiple catalysts were tested:

cata.1: catalyst, from the commercially available Aquivion® range, in the form of a polymer having the formula (8) in which q represents an integer ranging from 3 to 8, and r is an integer ranging from 1 to 2.

cata.2: triflic acid (commercially available catalyst).

The results in terms of rates of conversion of the unsaturated compound and selectivity towards monoestolides are indicated in Table 5 below.

TABLE 5

| | Catalyst | Molar Ratio of Unsaturated Compound/ Saturated Acid/Catalyst | T (° C.) | Conversion of Unsaturated Compound | Selectivity to Monoestolide |
|---|---|---|---|---|---|
| CI12 | Cata.1 | 1/6/0.2 | 80 | 53% | 83% |
| CI13 | Cata.2 | 1/6/0, 25 | 60 | 81% | 91% |

These two examples show that the method according to the invention makes it possible to obtain a very good compromise between selectivity and conversion.

Example 5: Implementation of Another Method According to the Invention

In this example, the addition reaction is carried out between a C18 monounsaturated fatty acid (unsaturated compound) and a saturated fatty acid. The fatty acid is derived from a sunflower oil with a high oleic content (HOSO type) having an oleic acid content greater than or equal to 80% by weight and a content of polyunsaturated compounds of approximately 3 to 5% by weight.

The method is carried out for a period of 8 hours in total, after a batch addition (non-fractionated) of the two reactants.

The temperature and the molar ratios of unsaturated compound/saturated acid/catalyst are indicated in Table 6 below.

Triflic acid (commercially available) was used as catalyst (cata.2).

The results in terms of rates of conversion of the unsaturated compound and selectivity towards monoestolides are indicated in Table 6 below.

TABLE 6

| | Saturated Fatty Acid | Molar Ratio of Unsaturated Compound/ Saturated Acid/Catalyst | T (° C.) | Conversion of Unsaturated Compound | Selectivity to Mono-estolide |
|---|---|---|---|---|---|
| CI14 | Nonanoic acid | 1/4/0.25 | 60 | 75% | 74% |
| CI15 | Dodecanoic acid | 1/4/0.25 | 60 | 71% | 75% |
| CI16 | Heptanoic acid | 1/4/0.25 | 60 | 78% | 71% |

This example shows that the method according to the invention makes it possible to obtain a very good compromise between selectivity and conversion.

The estolide composition CI14 comprises, at the end of the addition reaction (prior to any separation):

56% by weight of monoestolides in acid form;

20% by weight of polyestolides in acid form;

24% by weight of reactants unreacted oleic acid or oleic acid ester type;

relative to the total weight of the estolide composition resulting from the method.

The proportions of the ingredients of the estolide composition may be determined by gas chromatography, according to methods known to the person skilled in the art.

Example 6: Implementation of Another Embodiment of the Invention

In this example, the addition reaction is carried out between an oleic acid ester (unsaturated compound) and nonanoic acid (saturated fatty acid). The oleic acid ester is derived from a plant oil having an oleic acid content greater than 80% by weight and a content of polyunsaturated compounds less than 1% by weight.

The method is carried out for a period of 8 hours in total, after fractional addition of the unsaturated ester, every 30 minutes over a period of 7 hours, to a mixture containing the catalyst and the saturated fatty acid.

The catalyst tested in this instance is triflic acid (commercially available catalyst). The temperature used was 60° C. and the molar ratios of unsaturated compound/saturated acid/catalyst was 1/6/0.25.

Two esters were tested, as indicated in Table 7.

TABLE 7

| | Nature of the Unsaturated Ester | Conversion (%) | Selectivity (%) |
|---|---|---|---|
| CI17 | Methyl Oleate | 60 | 83 |
| CI18 | Isoamyl Oleate | 53 | 85 |

As shown in Table 7, when the alkyl part (deriving from the alcohol) of the unsaturated ester is more hindered, the conversion rate is somewhat lower while nevertheless remaining very suitable, and above all with the selectivity remaining very satisfactory, even when the unsaturated ester is hindered, with a longer alkyl part (deriving from the alcohol).

Example 7: Implementation of Another Embodiment of the Invention

In this example, the addition reaction is carried out between a C18 monounsaturated fatty acid (unsaturated compound) and nonanoic acid (saturated fatty acid). The fatty acid is derived from a sunflower oil with a high oleic content (HOSO type) having an oleic acid content greater than or equal to 80% by weight and a content of polyunsaturated compounds of approximately 3 to 5% by weight.

The catalyst used is a triflic acid supported on silica. This supported catalyst was prepared according to the following steps:

- Preparation of a suspension of 90.6 g of SiO2 in 315 mL of MTBE & adding of 7.4 g of triflic acid;
- Stirring of the mixture for a period of one hour at ambient temperature, approximately 25° C. (pink colouration);
- Concentration thereof followed by prolonged drying under reduced pressure for a period of 10 hours at 70° C. (obtaining of a powder).

The catalytic content of this supported catalyst is 0.50 mmol/g.

The method is carried out for a period of 8 hours in total, after a batch addition (non-fractionated) of the two reactants.

The results in terms of rates of conversion of the unsaturated compound and selectivity towards monoestolides are indicated in Table 8 below.

TABLE 8

| | Molar Ratio of Unsaturated Compound/ Saturated Acid/Catalyst | T (° C.) | Conversion of Unsaturated Compound | Selectivity to Mono-estolide |
|---|---|---|---|---|
| CI22 | 1/4/0.25 | 80 | 64% | 78% |
| CI23 | 1/4/0.05 | 80 | 57% | 84% |
| CI24 | 1/4/0.15 | 80 | 60% | 84% |
| CI25 | 1/2/0.15 | 80 | 67% | 54% |
| CI26 | 1/6/0.15 | 80 | 60% | 91% |
| CI30(1) | 1/6/0.15 | 80 | 69% | 80% |

(1) In this test, the catalytic content of this supported catalyst is 2 mmol/g (instead of 0.50 mmol/g)

This example shows that the method according to the invention makes it possible to obtain a very good compromise between selectivity and conversion.

Example 8: Modification of the Saturated Fatty Acid

The protocol of Example 7 was repeated by replacing the nonanoic acid with butyric acid.

The results in terms of rates of conversion of the unsaturated compound and selectivity towards monoestolides are indicated in Table 9 below.

TABLE 9

| | Molar Ratio of Unsaturated Compound/ Saturated Acid/Catalyst | T (° C.) | Conversion of Unsaturated Compound | Selectivity to Mono-estolide |
|---|---|---|---|---|
| CI27(1) | 1/6/0.15 | 80 | 60% | 84% |
| CI28(1) | 1/6/0.15 | 80 | 61% | 89% |
| CI29(1) | 1/6/0.15 | 80 | 60% | 81% |

This example shows that the method according to the invention makes it possible to obtain a very good compromise between selectivity and conversion.

Example 9: Implementation of Another Embodiment of the Invention

In this example, the addition reaction is carried out between an unsaturated compound (oleic acid or methyl oleate) and nonanoic acid (saturated fatty acid). The fatty acid is derived from a sunflower oil with a high oleic content (HOSO type) having an oleic acid content greater than or equal to 80% by weight and a content of polyunsaturated compounds of approximately 3 to 5% by weight.

The method is carried out for a period of 24 hours in total, after a batch addition (non-fractionated) of the two reactants.

The temperature and the molar ratios of unsaturated compound/saturated acid/catalyst are indicated in Table 10 below.

The catalyst used is a nonafluorobutanesulfonic acid (cata.4). This catalyst is commercially available.

The results in terms of rates of conversion of the unsaturated compound and selectivity towards monoestolides are indicated in Table 10 below.

TABLE 10

| | Unsaturated Compound | Molar Ratio of Unsaturated Compound/ Saturated Acid/Catalyst | T (° C.) | Conversion of Unsaturated Compound | Selectivity* to Mono-estolide |
|---|---|---|---|---|---|
| CI20 | Methyl oleate | 1/6/0.25 | 60° C. | 69.51 | 94.76 |
| CI21 | Oleic acid | 1 /6/0.25 | 60° C. | 75.91 | 84.20 |

*selectivity determined by size exclusion chromatography (GPC): 4 columns of 4.6 mm diameter (HRE, HR3, HR2, HR1) + precolumn (or guard column), flow rate 0.2 mL/min, refractive index (RI) detection This example shows that the method according to the invention makes it possible to obtain a very good compromise between selectivity and conversion.

Example 10: Lubricating Properties of the Estolide Compositions Obtained by the Method of the Invention The following properties, that serve the purpose of evaluating the performance of the base oils of the lubricating compositions, were determined:

- The kinematic viscosity at 40° C. (KV40) and at 100° C. (KV100) was measured according to the standard ASTM D7042.
- The Noack volatility was measured according to the standard ASTM D6375.
- The pour point (PP) was determined according to the standard ASTM D7346.

The estolide compositions CI7, CI14, CI15 and CI16 were then esterified with 2-ethylhexanol, under standard conditions in order to obtain estolides in ester form (CI7 ester, CI14 ester, CI15 ester and CI16 ester).

The results are indicated in Table 11 below.

TABLE 11

| | CI7 Ester | CI14 Ester | CI15 Ester | CI16 Ester |
|---|---|---|---|---|
| KV40 ($mm^2/s$) | 21.28 | 26.61 | 30.71 | 25.59 |
| KV100 ($mm^2/s$) | 4.87 | 5.756 | 6.351 | 5.592 |
| Noack (%) | 8.12 | 4.1 | 1.9 | 3.2 |
| PP (° C.) | −27 | −18 | −30 | −21 |

Tests were carried out on a rotating ball-on-disc tribometer of a type such as Mini Traction Machine, also referred to as MTM. They serve the purpose of evaluating the performance of lubricants in terms of friction in a mixed/hydrodynamic regime.

This test consists of setting a steel ball and a steel flat disk in relative motion, at different speeds, thereby making it possible to define the % SRR (ratio of sliding speed to entrainment speed, or Slide-to-Roll Ratio) which corresponds to the sliding speed/entrainment speed.

These tests were carried out on the estolide composition CI7 Ester, at three different temperatures (40° C., 100° C., and 150° C.), with a load of 1 GPa, by varying the % SSR. The results in terms of coefficient of friction are indicated in Table 12 below.

TABLE 12

| % SRR | 40° C. | 100° C. | 150° C. |
|---|---|---|---|
| 5 | 0.01020 | 0.00450 | 0.01107 |
| 10 | 0.01567 | 0.00683 | 0.01283 |
| 20 | 0.02223 | 0.01063 | 0.01527 |
| 40 | 0.02850 | 0.01587 | 0.01937 |
| 60 | 0.03130 | 0.01940 | 0.02233 |
| 80 | 0.03263 | 0.02230 | 0.02470 |
| 100 | 0.03313 | 0.02387 | 0.02677 |
| 120 | 0.03323 | 0.02500 | 0.02800 |
| 150 | 0.03263 | 0.02620 | 0.02957 |

The estolide composition according to the invention has good properties for use as a base oil in a lubricating composition.

We claim:

1. A method for preparing a composition of estolides that comprises reacting at least one unsaturated compound selected from among unsaturated fatty acids containing from 10 to 20 carbon atoms; with at least one saturated fatty acid containing from 4 to 18 carbon atoms; in the presence of at least one catalyst comprising at least one sulphonic acid functional group;

the said method including no vacuum distillation step thereby making it possible to separate the monoestolides from the polyestolides, wherein the estolide composition has an iodine number less than or equal to 13 g/100 g of iodine, the composition of estolides comprising, relative to the total weight of the estolides:

from 65 to 99.9% by weight of monoestolide(s) in the form of acid and/or ester; and from 0.1 to 35% by weight of polyestolide(s) in the form of acid and/or ester, wherein at least 50% by weight of the polyestolide(s) in the form of acid and/or ester have an estolide number EN equal to 2, EN being equal to 1 for the monoestolides and EN being greater than 1 for the polyestolides.

2. The method according to claim 1, that does not include the successive steps (i) and (ii), where (i) is the mixing of 1 equivalent of 2-ethylhexyl oleate with 6 equivalents of lauric acid in the presence of 0.25 equivalent of triflic acid; and (ii) is the heating at 60° C. for 24 hours of the mixture obtained in step (i).

3. The method according to claim 1, wherein the unsaturated compound is selected from among unsaturated fatty acids containing from 11 to 20 carbon atoms.

4. The method according to claim 3, further comprising an esterification step for esterifying the composition of estolides obtained.

5. The method according to claim 1, wherein the catalyst is selected from:

a catalyst having the formula $RSO_3H$, the catalyst being optionally supported, where R is a hydrogen atom or a linear, branched or cyclic hydrocarbon radical having from 1 to 18 carbon atoms, optionally substituted by one or more heteroatoms; and a catalyst in the form of a polymer having the formula (1):

[Chem 1]

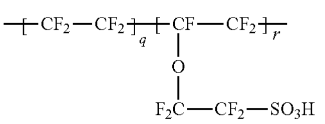

wherein q and r represent independently of each other a number ranging from 1 to 15.

6. The method according to claim 1, wherein the reaction is carried out at a temperature ranging from 20 to 90° C.

7. The method according to claim 1, wherein the molar ratio of the unsaturated compound/saturated fatty acid ranges from 1/10 to 1/1.

8. The method according to claim 1, wherein the molar ratio of the unsaturated compound/catalyst ranges from 1/0.1 to 1/1.

9. An estolide composition that is obtainable by the method according to claim 1, the composition comprising, relative to the total weight of the estolides:

from 65 to 99.9% by weight of monoestolide(s) in the form of acid and/or ester; and from 0.1 to 35% by weight of polyestolide(s) in the form of acid and/or ester, wherein the estolide composition has an iodine number less than or equal to 13 g/100 g of iodine, wherein at least 50% by weight of the polyestolide(s) in the form of acid and/or ester have an estolide number EN equal to 2, EN being equal to 1 for the monoestolides and EN being greater than 1 for the polyestolides.

10. The estolide composition according to claim 9, comprising, relative to the total weight of the estolides:

from 65 to 99.9% by weight of monoestolides replying to the formula (8) and/or to the formula (9); and from 0.1 to 35% by weight of polyestolides replying to the formula (10) and/or to the formula (11);

where

[Chem 8]

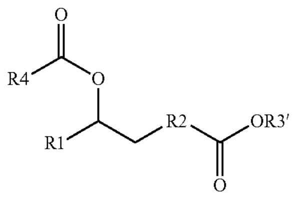

[Chem 9]

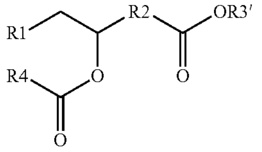

-continued

[Chem 10]

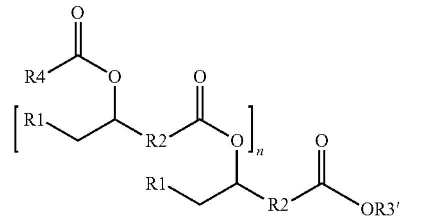

[Chem 11]

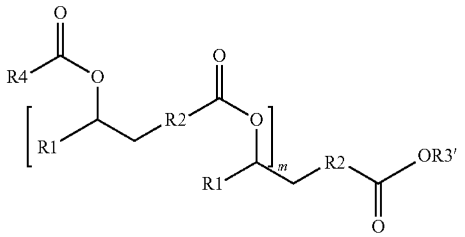

wherein:

R1 represents a hydrogen atom or a monovalent alkyl radical, either linear or branched, containing from 1 to 16 carbon atoms;

R2 represents a divalent alkylene radical, either linear or branched, containing from 1 to 16 carbon atoms;

it being understood that the sum of the number of carbon atoms of R1 and R2 ranges from 7 to 17;

R4 represents a monovalent alkyl radical, either linear or branched, containing from 5 to 17 carbon atoms;

R3' is a hydrogen atom or a monovalent alkyl radical, either linear or branched, containing from 1 to 16 carbon atoms;

n and m are independent of each other and other than zero.

11. A lubricating composition comprising the estolide composition according to claim 8 and at least one base oil other than the estolides and/or at least one additive.

12. The method according to claim 4, wherein the esterification step for esterifying the composition of estolides obtained, is performed by reaction of the estolides with an alcohol containing from 1 to 16 carbon atoms.

13. The method according to claim 7, wherein the molar ratio of the unsaturated compound/saturated fatty acid ranges from 1/8 to 1/4.

14. The method according to claim 8, wherein the molar ratio of the unsaturated compound/catalyst ranges from 1/0.15 to 1/0.5.

15. The estolide composition according to claim 10, wherein:

the monoestolides replying to the formula (8) and/or to the formula (9) represent from 70 to 95% wt of total weight of the estolide composition, and the polyestolides replying to the formula (10) and/or to the formula (11) represent from 5 to 30% wt of the total weight of the estolide composition.

16. The estolide composition according to claim 10, wherein in formulas (8), (9), (10) and (11):

R1 represents a hydrogen atom or a linear alkyl containing from 5 to 12 carbon atoms;

R2 represents a divalent linear alkylene containing from 4 to 9 carbon atoms;

the sum of the number of carbon atoms of R1 and R2 ranges from 8 to 17;

R3' is a hydrogen atom or a monovalent alkyl radical, either linear or branched, containing from 1 to 10 carbon atoms;

n and m are independent of each other and n and m range from 1 to 4.

17. The estolide composition according to claim 9, having an iodine number less than or equal to 12 g/100 g of iodine.

18. The estolide composition according to claim 9, having an iodine number less than or equal to 10 g/100 g of iodine.

* * * * *